United States Patent
Schwarzelbach

(10) Patent No.: US 7,520,169 B2
(45) Date of Patent: Apr. 21, 2009

(54) ANGULAR RATE SENSOR FEATURING MECHANICALLY DECOUPLED OSCILLATION MODES

(75) Inventor: Oliver Schwarzelbach, Itzehoe (DE)

(73) Assignee: Fraunhofer-Gesellschaft Zur Foerderung Der Angewandten Forschung E.V., Munich (DE)

( * ) Notice: Subject to any disclaimer, the term of this patent is extended or adjusted under 35 U.S.C. 154(b) by 50 days.

(21) Appl. No.: 11/578,024

(22) PCT Filed: Apr. 7, 2005

(86) PCT No.: PCT/EP2005/003670

§ 371 (c)(1),
(2), (4) Date: Oct. 10, 2006

(87) PCT Pub. No.: WO2005/098358

PCT Pub. Date: Oct. 20, 2005

(65) Prior Publication Data

US 2007/0194857 A1 Aug. 23, 2007

(30) Foreign Application Priority Data

Apr. 8, 2004 (DE) .................. 10 2004 017 480

(51) Int. Cl.
*G01C 19/56* (2006.01)
*C01P 9/04* (2006.01)

(52) U.S. Cl. .................. 73/504.12; 73/504.14

(58) Field of Classification Search .............. 73/504.02, 73/504.04, 504.12, 504.14, 504.15
See application file for complete search history.

(56) References Cited

U.S. PATENT DOCUMENTS 5,955,668 A 9/1999 Hsu et al.

(Continued)

FOREIGN PATENT DOCUMENTS

DE 19500800 12/1995

(Continued)

OTHER PUBLICATIONS

Acar, "Distributed-Mass Micromachined Gyroscopes for Enhanced Mode-Decoupling," IEEE, vol. 2 of 2, Conf 2, (2003).

*Primary Examiner*—Helen C. Kwok
(74) *Attorney, Agent, or Firm*—Rissman Jobse Hendricks & Oliverio, LLP

(57) ABSTRACT

An angular rate sensor for detecting a rotation includes a substrate, at least one oscillating element that can be excited so as to oscillate rotationally or radially, an anchor structure, one or several detecting elements, one or several joining elements that connect the detecting element/s to the oscillating element, a mechanism for exciting the oscillating element, and a device for detecting a radial or rotational oscillation of the detecting element/s. Each of the detecting elements can oscillate radially on the same plane on which rotational oscillation of the oscillating element occurs, or vice versa, while the centrifugal force Fz caused by the rotational oscillation will not cause any significant radial movement of the detecting element/s or the oscillating elements. Also disclosed are different methods for operating said sensor.

19 Claims, 5 Drawing Sheets

U.S. PATENT DOCUMENTS

| | | | |
|---|---|---|---|
| 5,992,233 A | 11/1999 | Clark et al. | |
| 6,250,157 B1 | 6/2001 | Touge | |
| 6,308,567 B1 | 10/2001 | Higuchi et al. | |
| 6,386,033 B1 * | 5/2002 | Negoro | 73/504.12 |
| 6,823,733 B2 * | 11/2004 | Ichinose | 73/504.02 |
| 6,928,876 B2 * | 8/2005 | Campbell | 73/514.32 |
| 7,043,985 B2 * | 5/2006 | Ayazi et al. | 73/504.04 |

FOREIGN PATENT DOCUMENTS

| | | |
|---|---|---|
| DE | 19928307 | 12/1999 |
| EP | 0906557 | 12/1999 |
| EP | 0971208 A | 1/2000 |
| EP | 1416250 | 5/2004 |
| WO | WO-01/79862 | 10/2001 |

* cited by examiner

ANGULAR RATE SENSOR FEATURING MECHANICALLY DECOUPLED OSCILLATION MODES

FIELD OF THE INVENTION

The present invention relates to an angular rate sensor, in particular a micro-mechanical angular rate sensor for detecting a rotation by using the motion-induced Coriolis force.

BACKGROUND OF THE INVENTION

Micro-mechanical angular rate sensors (gyroscopes) are known in the art. They have been fabricated for some time on silicon wafers using conventional etching techniques. They can include a first element (primary oscillator, drive element) arranged in an x-y plane which is excited to perform an oscillatory motion, and a second element (secondary oscillator, output element) used for detection, which is connected with the first element via connecting elements. When the sensor performs a rotation motion $\Omega$ about an axis perpendicular to the oscillation axis, the Coriolis force of $2\,m\,v_r \times u$ acts on the various masses of the body performing the rotation oscillation; this force is transferred by suitable measures to the detection element so as to deflect the detection element out of the x-y plane. This rotation motion is then detected by suitable means, e.g., by capacitive electrodes.

The aforedescribed system has been implemented to date in two different embodiments. EP 0906557 B1 describes an angular rate sensor with decoupled orthogonal primary and secondary oscillations. The primary oscillator is attached via a primary oscillator support in the center on the substrate and supports via torsion springs a secondary oscillator located in the same plane, wherein the torsion springs rigidly transfer the induced oscillation of the primary oscillator to the secondary oscillator. When the sensor rotates about a plane perpendicular to the plane in which the two oscillating elements are located, the Coriolis force affects both elements. While the secondary oscillator is then tilted out of its plane, the primary oscillator remains in this plane, because it is, on one hand, anchored on the substrate, making it nearly impossible for the primary oscillator to tilt out of this plane and, on the other hand, the torsion springs prevent the Coriolis force acting on the secondary oscillator to be coupled back to the primary oscillator.

The approach disclosed in U.S. Pat. No. 5,955,668 goes just the opposite way: the oscillating element, which is excited to perform a radial oscillation, encircles a tiltable sensor element which is attached to a substrate by way of two anchors. Torsion springs connect the oscillating element with the sensor element and are configured to neither transfer the oscillation of the oscillating element to the sensor element nor to couple the tilting motion of the sensor element produced by the Coriolis force back to the oscillating element.

The two aforementioned angular rate sensors are configured, as mentioned above, so as to be capable of detecting rotation motion perpendicular to the axis of the excited rotation oscillation. The rotation motion is hereby always detected through a deflection of the detection element out of the plane of the excitation oscillation; one side of the detection element hereby tilts towards the substrate on which the structure consisting of oscillation and detection element is anchored. Any gas molecules trapped between the substrate and the detection element can cause attenuation which distorts the result. These angular rate sensors must therefore be sealed in an evacuated housing.

The oscillating modes of oscillating element and detection element of the aforementioned angular rate sensors are not decoupled in the oscillation plane of the oscillating element. They are therefore incapable of detecting a rotation motion about the same axis about which the excitation element oscillates.

Accordingly, a way should be found for measuring the force to be detected independent of the centrifugal force produced by the excitation oscillation. U.S. Pat. No. 6,308,567 B1 proposes an angular rate sensor where two pairs of opposing masses are excited so as to perform a rotation oscillation in mutually opposite directions. Due to this oscillation, all these masses experience a centrifugal force in a radially outward direction. If an external rotation motion (to be detected) is applied to the system, then the vector of the resulting Coriolis force points for one pair of masses in the outward radial direction and for the other pair of masses in the inward radial direction. The effective measured force of the one mass pair is then subtracted by a computation from that of the other mass pair, which eliminates the centrifugal force from the total equation, whereas the absolute values of the Coriolis force are added together with a positive sign.

To ensure symmetry when eliminating the centrifugal force in the computation, four well matched C/V converters must be employed. Also required is a circuit for performing the required computation to eliminate the centrifugal force. The necessary evaluation circuit requires considerable space, which directly impacts production costs.

It is an object of the present invention to provide an angular rate sensor which obviates this disadvantage.

SUMMARY OF THE INVENTION

The angular rate sensor of the invention includes one or more detection elements whose oscillation mode(s) is/are mechanically decoupled from the oscillation mode(s) of the oscillating element(s), although both the oscillating element(s) and the detection element(s) oscillate in the same plane. This decoupling is achieved by providing connecting elements between oscillating element(s) and detection element(s) which, on one hand, rigidly transfer rotation oscillations (excitation oscillation $v_D$, detection oscillation $v_S$) between oscillating element and detection element and are, on the other hand, configured so that a radial oscillation of the oscillating element or of the detection element is not transferred to the respective other element. These connecting elements can be implemented as springs capable of radial oscillations with a resonance frequency f2 equal to the resonance frequency f1 of the excitation oscillation $v_D$ or the resonance frequency f1* of the detection oscillation $v_S$. If the oscillating element is excited to perform a rotation oscillation, its oscillation mode acts on the detection element with twice the frequency due to the centrifugal force which is always oriented radially outwardly from the anchor point. If the oscillating element is excited to perform a radial oscillation, the Coriolis force causes a rotation oscillation of the detection element when the sensor is externally rotated, and the oscillating mode of the detection element operates on the oscillating element with twice the frequency for the same reason.

The two oscillating modes are decoupled as follows:

a) If the drive oscillation is a rotation oscillation, the rotation speed affects the detection element in such a way that it begins a radial oscillation with the same frequency as the excitation oscillation $f_D$ due to the Coriolis force; (the disturbance signal with the frequency $2*f_D$ caused by the centrifugal force can be separated by a suitable electronic filter circuit, e.g., by synchronous demodulation, from the useful signal having a frequency $f_D$, which is produced by the rotation speed-dependent Coriolis force, b) If the drive oscillation is a radial oscillation, then the rotation speed affects the detection element in such a way that it begins a rotation oscillation with the same frequency as the excitation oscillation $f_{D^*}$ due to the Coriolis force; (the disturbance signal can be separated from the excitation oscillation as described under a)), or c) By operating the arrangement in such a way (for example in a vacuum) that mechanical, radial oscillations with frequencies outside the resonance frequency of the excitation oscillation, such as for example the disturbance signal with the frequency $2^*f_D$, are strongly attenuated; or d) by a combination of a) and c), or e) by a combination of b) and c).

BRIEF DESCRIPTION OF THE DRAWINGS

Examples of the invention will now be described in detail with reference to the drawings, in which.

DETAILED DESCRIPTION OF CERTAIN ILLUSTRATED EMBODIMENTS

The following designations will be used throughout the specification for oscillations and frequency:

$v_D$, $v_{D^*}$: excitation (drive) oscillation, reference oscillation $f_D$, $f_{D^*}$: frequency of $v_D$, $v_{D^*}$ f1: resonance frequency of this oscillating system $f_D$, $f_{D^*}$ is generally selected so as to coincide with f1 for achieving the largest possible oscillation amplitude: $f_D$=f1

$v_S$: detection (sense) oscillation, measurement oscillation $f_S$: frequency of $v_S$ f2: resonance frequency of this oscillating system By matching the geometry, f2 is approximately equal to f1.

fMD: modulation frequency for measuring the reference oscillation fMS: modulation frequency for measuring the measurement oscillation.

$f_Z$: frequency of the (disturbance) oscillation produced by the centrifugal force.

Figure 1:
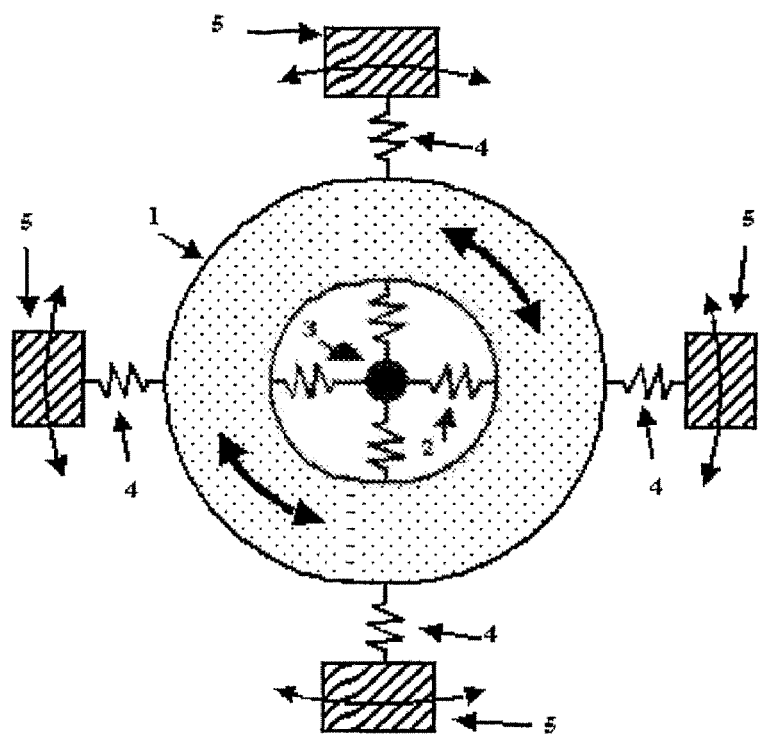
FIG. 1 shows schematically a top view of a specific embodiment of the angular rate sensor of the invention.
Figure 2:
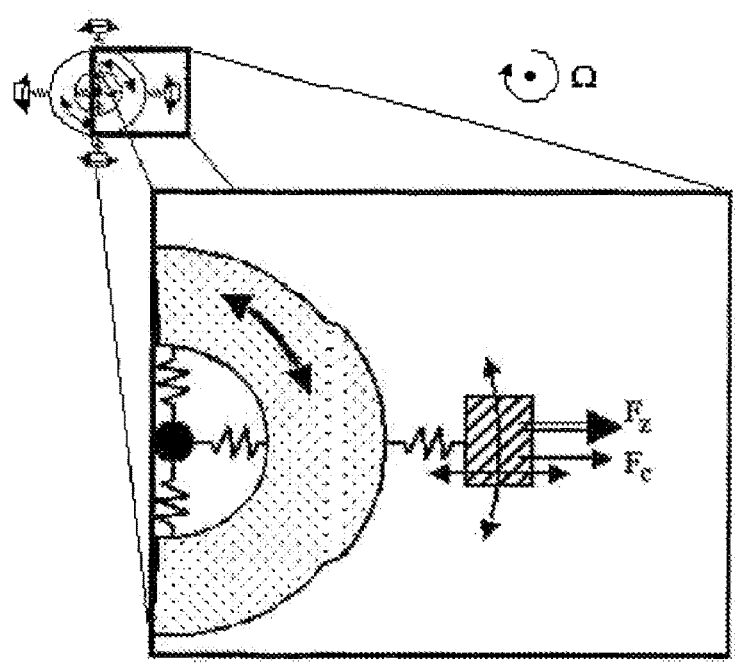
FIG. 2 shows a diagram with the forces which occur during a rotation of the device.

Exemplary embodiments of the present invention will now be described in more detail with reference to FIGS. 1 to 9. FIGS. 1 and 6 illustrate embodiments of the angular rate sensor of the invention. The sensor includes an oscillating element 1 which represents a physical, freely movable mass. The shape of this element can be freely selected depending on other space requirements of the sensor structure. The oscillating element is connected with the base or substrate by a central anchor structure 3, which in the illustrated embodiments is implemented with springs. The number of springs is in all examples equal to four; however, it will be understood that a different number of springs can be employed.

Masses 5 operating as detection elements are attached to the oscillating element 1 by way of connecting elements 4 embodied as springs. It will also be understood that implementation of the connecting elements in the form of springs is only by way of example; this applies also to the number of springs and the number of detection elements connected to the springs.

Figure 3:
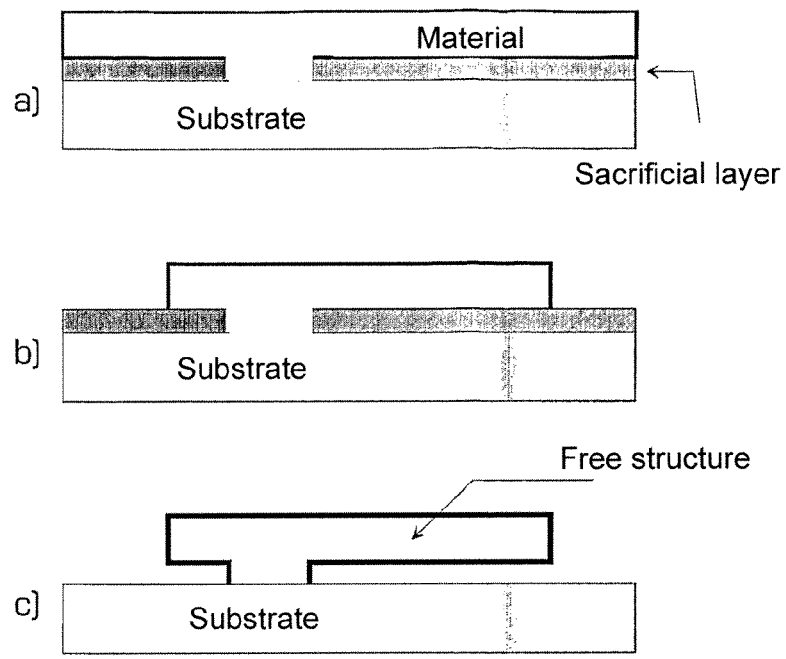
FIG. 3 shows schematically the design of an angular rate sensor according to the invention in a cross-section through an x-z or a y-z plane as well as a possible fabrication technique for such sensors.

In the exemplary embodiment of FIG. 1, four symmetrically arranged masses are provided which are located radially outside the oscillating element. This is different from FIG. 6 which shows a mirror-symmetric embodiment with two detection elements, wherein each of the detection elements is disposed with springs in a recess of the oscillating element. FIG. 3 shows schematically in a cross-section through a x-z or y-z axis a possible design of the angular rate sensors according to the invention and a process for their fabrication. The illustrated design is particularly advantageous because it includes only a few components and provides an integral structure of anchor, oscillating element, connecting elements (springs) and detection elements: a substrate, for example a silicon wafer, is covered with a patterned sacrificial layer, for example with an oxide that can be dissolved in a suitable solvent. This layer is then covered with a patterned layer made of another material, for example poly-silicon, from which the oscillating element, the anchor structure, the connecting elements and the detection elements are to be formed (FIG. 3a). The patternable layer is directly connected with the substrate at the location of the subsequently deposited anchor. The layer can be exclusively two-dimensional, for example, patterned by suitable measures, such as by exposure through a hole mask and subsequent dissolution of the exposed surfaces which are not cross-linked (FIG. 3b). The sacrificial layer is then also dissolved and removed (FIG. 3c).

The angular rate sensor of the invention can be operated in several ways. For example, an oscillating element can be excited to perform a rotation oscillation, and the Coriolis force produced during the rotation of the sensor is measured as a radial oscillation. In this case, it must be ensured that the centrifugal force produced by the excitation oscillation does not disturb the measurement. Alternatively, at least one oscillating element can be excited to perform a radial oscillation, in which case the Coriolis force generated during a rotation of the sensor is detected as a rotation oscillation. Although the presence of a centrifugal force (produced by the rotation oscillation) in this variant does not directly affect detection of the Coriolis force, care should be taken said that the centrifugal force does not interfere with the likewise radial excitation oscillation.

Although the angular rate sensor can have the same design for both variants, the individual components operate differently. Both variants will be described hereinafter with reference to the Figures, in which the same components are indicated with identical reference symbols. However, the different components are referred to by different names in the following description, commensurate with the different functionality of these components.

The first operating mode will now be described in detail.

Figure 4:
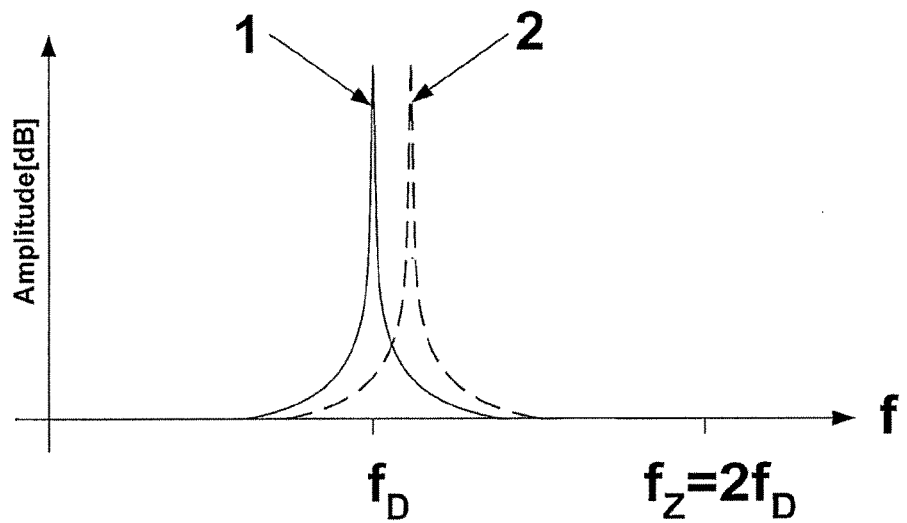
FIG. 4 shows the position of the resonance frequencies of reference oscillation f1 (excitation oscillation) and detection oscillation f2.

FIG. 4 shows the position of the resonance frequencies of reference oscillation f1 (excitation oscillation) and detection oscillation f2. The frequency of the centrifugal force (2× reference oscillation) is located in a strongly attenuated region. The frequencies (1) and (2) can be adjusted by adjusting the geometry.

Figure 5:
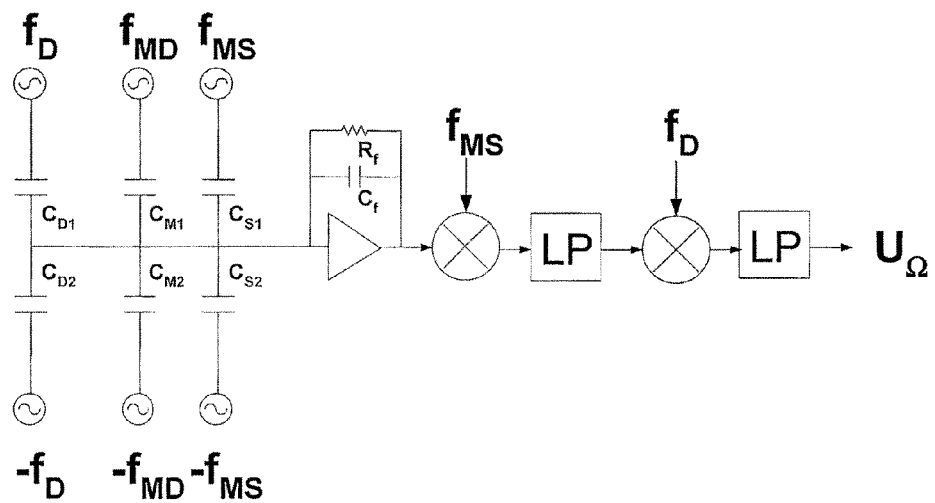
FIG. 5 shows in a simplified embodiment a possible electronic evaluation circuit for the angular rate sensor of the invention.
Figure 6:
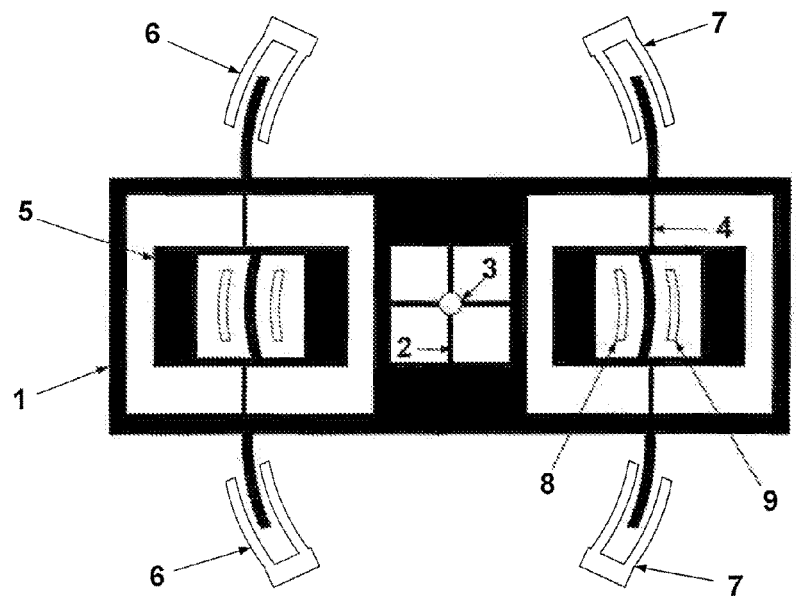
FIG. 6 shows a specific embodiment of an angular rate sensor according to the invention in a rest position.

FIG. 5 shows a simplified diagram of an exemplary electronic evaluation circuit for the angular rate sensor of the invention. This is a so-called up-shift modulation method which is frequently used for measuring capacitive sensors. Two synchronous demodulators (combination of multiplier/low pass filter) stepwise extract the amplitude values of the desired frequency components (first those of the modulation signal fMS, then those of the excitation oscillation $f_D$) from the total signal.

FIGS. 6 to 9 illustrate excitation and detection devices for the excitation oscillation and for the radial oscillation to be measured: in the example, capacitive electrodes and the like, implemented, for example, as interdigitated structures, excite the oscillating elements (reference symbol 6 in the first variant) and measure their position (reference symbol 7 in the first variant), wherein the radial position of the detection element is measured by the electrode structures (reference symbols 8 and 9 in the first variant), which can also be implemented, for example, in form of interdigitated electrodes.

Figure 7:
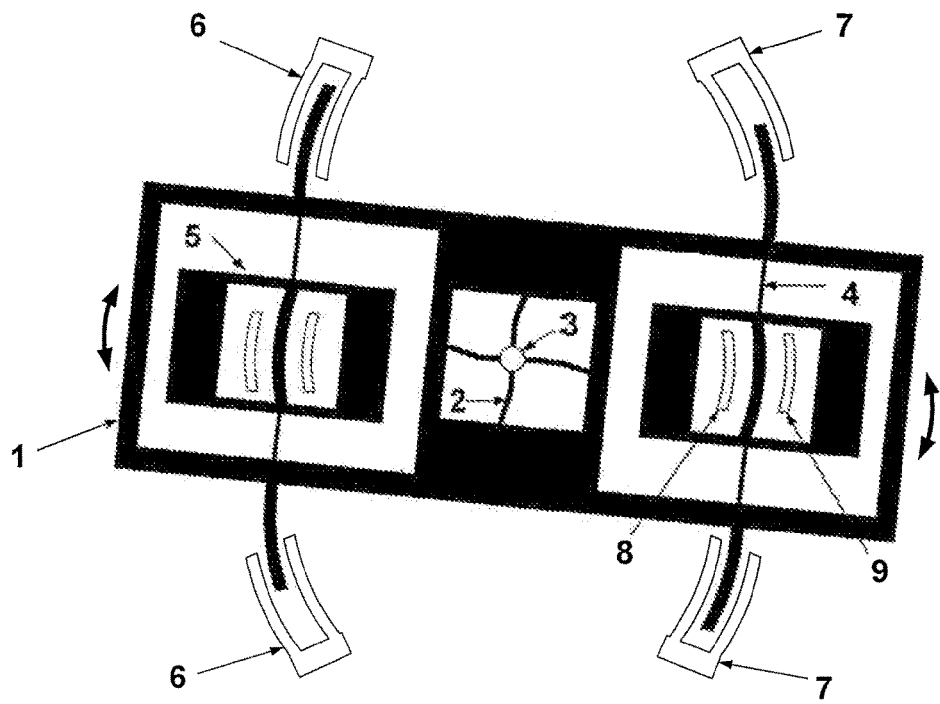
FIG. 7 depicts the sensor of FIG. 6 in a deflected position with respect to the applied rotation oscillation according to a first embodiment of the invention.
Figure 9:
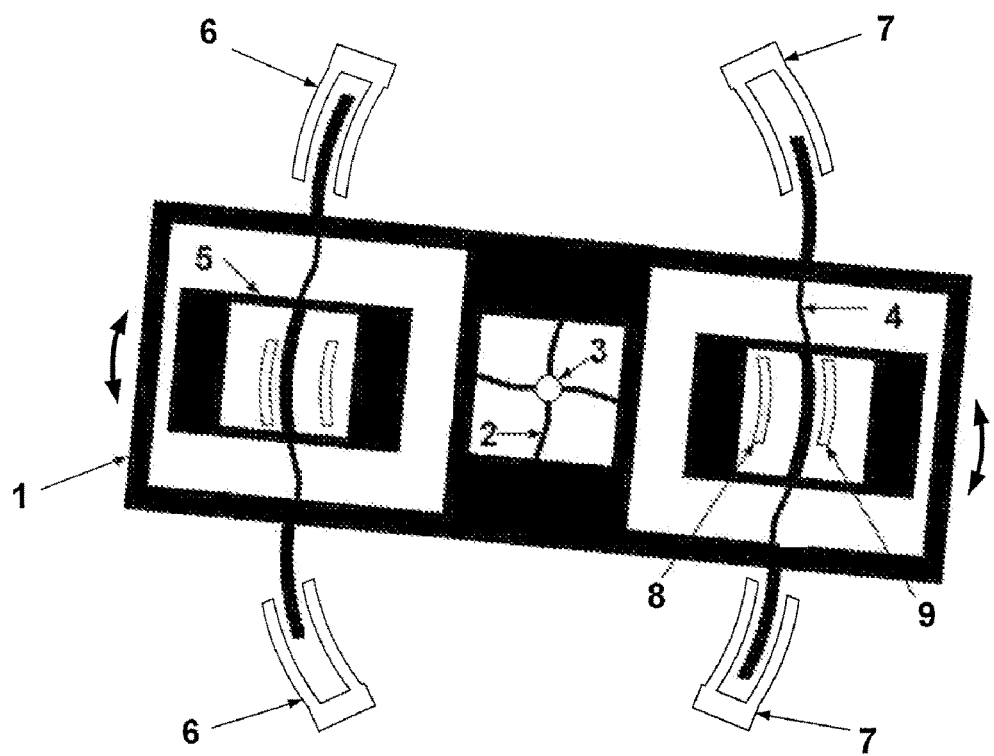
FIG. 9 shows the position of the sensor caused by a rotation motion to be detected either by the rotationally oscillating sensor according to the first embodiment of the invention depicted in FIG. 7, or by the sensor oscillating in the radial direction according to the second embodiment of the invention depicted in FIG. 8.

The operation of the sensor of the invention according to the first variant is illustrated sequentially in FIGS. 6, 7 and 9. In FIG. 6, the sensor is in the rest position. During operation, the oscillating element 1 is excited to perform a rotation oscillation, i.e., an excitation oscillation $v_D$ with a constant frequency ($f_D$) and amplitude about the anchor point (the z-axis) and parallel to the substrate plane (x-y plane) (see FIG. 7). The rotation oscillation can be excited by conventional methods and by using conventional elements, for example by applying interdigitated structures to which an alternating voltage with the frequency $f_D$ is applied. Such structures are generally used in other micro-angular rate sensors, as discussed, for example, in the aforementioned publications. The rotation oscillation can also be measured for monitoring purposes via such structures.

Because the springs 4 are stiff with respect to the rotation oscillation, the detection elements 5 connected to the springs follow this oscillation with the same frequency. A rotation acceleration does not cause bending oscillations in the rotation direction. The oscillating rotation imparts a centrifugal acceleration $a_Z$ on the detection elements 5 which is oriented radially outwardly during each half wave of the rotation oscillation. Accordingly, the masses are excited by a centrifugal force $F_Z$ (see FIG. 2) with a frequency $f_Z$ which is twice the resonance frequency of the rotation oscillation. Accordingly, $f_Z$ is equal to $2 \times f_D$ (as indicated by the double arrow).

The springs 4 between the oscillating element and the detection elements are designed so that a radial oscillation of the detection elements 5 relative to the anchor element 3 has the same resonance frequency $f_2$ as the rotation oscillation of the oscillating element 1 (i.e., $f_1=f_2$). Radial oscillations away from the resonance frequency are strongly attenuated. As a result, the centrifugal force $F_Z$ does not cause any motion in the radial direction.

Outside the resonance frequency, damping is so strong that an oscillation excited by the centrifugal force $F_Z$ is strongly attenuated, so that both oscillation systems can be viewed as being decoupled.

If the combined system is subjected to a rotation speed Q, which rotates about the same axis z as the oscillation of the oscillating element, then the Coriolis force $F_C$ acting on the detection elements 5 excites an oscillation of the detection elements 5 in the radial direction (see FIG. 9). The amplitude of this oscillation is modulated with the magnitude of the rotation speed.

Figure 8:
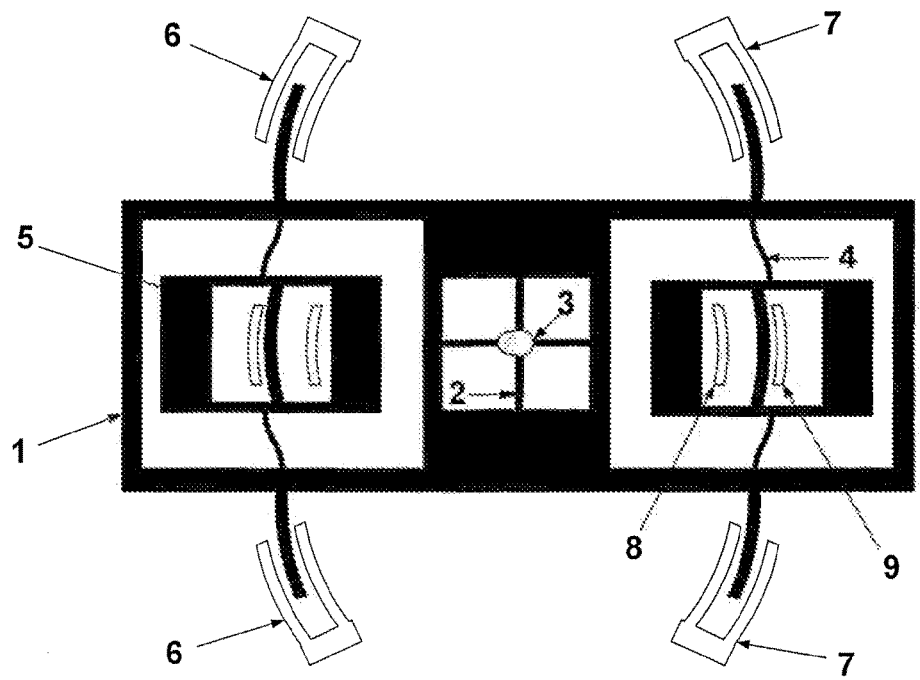
FIG. 8 shows the same sensor in a deflected position with respect to the applied radial oscillation according to a second embodiment of the invention.

In the second operating mode, a radial oscillation is applied to the sensors, as shown sequentially in FIGS. 6, 8 and 9. Accordingly, the elements have different functionality: the element 1 which in the first operating mode operates as an oscillating element, is in this variant a detection element whose rotation oscillation is measured with the interdigitated structures 6, 7. The elements 5, which in the first operating mode function as detection elements, are in the second operating mode embodied as oscillating elements, which are excited by the excitation electrodes 8 to perform a radial oscillation. The radial oscillation is monitored by the electrodes 9. The detection element is connected with the base or substrate via the central anchor structure 3 and the springs 2. The springs 4 connect the excitation elements 5 with the detection element 6.

During operation, the oscillating elements 5 are excited to perform a radial excitation oscillation $v_{D*}$ with a constant frequency ($f_{D*}$) and an amplitude in an arbitrary direction parallel to the substrate plane (x-y plane) (see FIG. 8). The radial oscillation can be excited using the same methods and similar elements as described above for the first operating mode. These are the elements 8 and 9 in FIGS. 6 and 8.

An externally applied rotation speed to be detected causes a rotation oscillation of the excitation elements 5. Because the springs 4 are stiff with respect to this rotation oscillation, the detection element 1 connected with the springs 4 follows this oscillation, which is detected via the elements 8 and 9. The oscillating rotation also imparts a centrifugal acceleration $a_Z$ on the excitation elements 1 which points radially outwardly during each half wave of the rotation oscillation. Accordingly, the masses of the excitation elements are excited with a centrifugal force $F_Z$ with a frequency $f_Z$ which is twice the resonance frequency of the rotation oscillation. Accordingly, $f_Z$ is here also equal to $2 \times f_D$.

The springs 4 between the oscillating elements and the detection element are designed so that a radial oscillation of the oscillating elements 5 with respect to the anchor element 3 has the same resonance frequency $f_2$ as the rotation oscillation of the detection element 1 (i.e., $f_{D*}=f_2$). Radial oscillations away from the resonance frequency are strongly attenuated. As a result, the centrifugal force $F_Z$ does not cause any motion in the radial direction.

Outside the resonance frequency, damping is so strong that an oscillation excited by the centrifugal force $F_Z$ is strongly attenuated, so that both oscillation systems can be viewed as being decoupled.

If the combined system is subjected to a rotation speed Ω, which rotates about an axis z perpendicular to the oscillation of the oscillating element, then the Coriolis force $F_C$ acting on the excitation elements 5 excites an oscillation of both the excitation elements 5 and, via the bending-resistant springs 4, likewise of the detection element that is perpendicular to the z-axis (see FIG. 9). The amplitude of this oscillation is modulated with the magnitude of the rotation speed.

Due to the decoupling, the excitation oscillation is hence not disturbed by centrifugal forces.

The radial oscillation(s) of the detection element(s) can be measured with conventional methods, for example capacitively via interdigitated structures.

It will be understood that the connecting elements can also be implemented using structures other than the aforedescribed springs, as long as they have the aforedescribed functionality.

The invention claimed is:

1. An angular rate sensor for detecting a rotation of the sensor, the sensor comprising:
   a substrate;
   at least one oscillating element;
   an anchor structure connecting the at least one oscillating element with the substrate;
   at least one detection element configured for performing a radial oscillation in the plane;
   one or more connecting elements connecting the at least one detection element with the at least one oscillating element;
   a detection device for detecting the radial oscillation of the at least one detection element; and
   an excitation device for exciting the at least one oscillating element to perform a rotation oscillation in the plane, said rotation oscillation producing a centrifugal force imparting the at least one detection element,
   wherein the centrifugal force is insufficient to initiate a radial movement of the at least one detection element.

2. The angular rate sensor of claim 1, wherein the anchor structure comprises a spring assembly capable of being deflected in an oscillation plane of the oscillating element, but otherwise resisting bending.

3. The angular rate sensor of claim 1, wherein the angular rate sensor is mirror-symmetric or rotationally-symmetric.

4. The angular rate sensor of claim 1, wherein the sensor comprises a single oscillating element and the at least one detection element is farther away from the anchor structure in a radial direction than the single oscillating element.

5. The angular rate sensor of claim 1, wherein the sensor comprises a single detection element and the at least one oscillating element is farther away from the anchor structure in a radial direction than the single detection element.

6. The angular rate sensor of claim 1, wherein the sensor comprises a single oscillating element and the at least one detection element is disposed in recesses of the single oscillating element.

7. The angular rate sensor of claim 1, wherein the angular rate sensor includes 2, 3, 4, 6 or 8 detection elements.

8. The angular rate sensor of claim 1, wherein the angular rate sensor includes 2, 3, 4, 6 or 8 oscillating elements.

9. The angular rate sensor of claim 1, wherein the sensor comprises a single oscillating element and wherein the detection element or each of the detection elements is connected with the single oscillating element via one connecting element.

10. The angular rate sensor of claim 1, wherein the detection element or each of the detection elements is supported by two or more connecting elements.

11. The angular rate sensor of claim 1, wherein each of the one or more connecting elements is substantially rigid with respect to the rotation oscillation, such that the rotation oscillation is transmitted from the at least one oscillating element to the at least one detection element, while enabling the radial oscillation of the at least one detection element relative to the at least one oscillation element.

12. The angular rate sensor of claim 11, wherein the one or more connecting elements each comprise a spring assembly connecting one of the detection elements with one of the oscillating elements,
   wherein a resonance frequency of the radial oscillation is identical with a resonance frequency of the rotation oscillation, and
   wherein the spring assembly strongly attenuates a radial oscillation of the at least one detection element or of the at least one oscillating element outside the resonance frequency.

13. A method for detecting a rotation motion about a rotation axis with an angular rate sensor which comprises:
   a substrate;
   at least one oscillating element configured for performing a rotation oscillation in a plane perpendicular to the rotation axis;
   an anchor structure connecting the at least one oscillating element with the substrate;
   at least one detection element;
   at least one connecting element connecting the at least one detection element with the at least one oscillating element;
   a detection device for detecting a radial oscillation of the at least one detection element; and
   an excitation device for exciting the oscillating element to perform a rotation oscillation in the plane, said rotation oscillation producing a centrifugal force imparting the at least one detection element, wherein the centrifugal force is insufficient to produce a radial motion of the at least one detection element,
   wherein the at least one oscillating element is excited to perform a rotation oscillation in the plane, and
   wherein the radial oscillation of the at least one detection element produced by the Coriolis force due to the rotation of the sensor about the rotation axis is detected.

14. The method according to claim 13, wherein the radial oscillation is measured capacitively via interdigitated structures.

15. The method of claim 13, further comprising decoupling the rotation oscillation from the radial oscillation by exciting the rotation oscillation with an excitation frequency and selecting a rotation speed so that the Coriolis force initiates a radial oscillation of the at least one detection element with the same frequency as the excitation frequency.

16. The method of claim 13, further comprising decoupling the rotation oscillation from the radial oscillation by exciting the radial oscillation with an excitation frequency and causing the Coriolis force to initiate a rotation oscillation of the at least one detection element with the same frequency as the excitation frequency.

17. The method of claim 13, further comprising decoupling the rotation oscillation from the radial oscillation by exciting the radial oscillation with an excitation frequency, wherein the radial oscillation having frequencies outside a resonance frequency of an excitation oscillation are strongly attenuated.

18. The method of claim 15, further comprising separating with an electronic filter an interfering signal with a frequency produced by the centrifugal force from a useful signal of the radial oscillation.

19. The method of claim 17, further comprising operating the angular rate sensor in vacuum to attenuate the radial oscillation with frequencies outside the resonance frequency.

* * * * *